United States Patent
Kobayashi et al.

[11] Patent Number: 5,241,530
[45] Date of Patent: Aug. 31, 1993

[54] POLYCARBONATE TURNTABLE FOR A COMPACT DISK PLAYER

[75] Inventors: Kazuo Kobayashi; Yoshinori Yamada; Masakazu Kurumada; Shinji Nakayama; Akira Takahashi; Fuyuki Shirai, all of Saitamaken, Japan

[73] Assignee: Pioneer Electronic Corporation, Tokyo, Japan

[21] Appl. No.: 873,510

[22] Filed: Apr. 24, 1992

Related U.S. Application Data

[63] Continuation of Ser. No. 582,080, Sep. 14, 1990, abandoned.

Foreign Application Priority Data

Feb. 9, 1990 [JP] Japan .................. 2-31102

[51] Int. Cl.⁵ .................. G11B 3/60
[52] U.S. Cl. .................. 369/264; 369/271
[58] Field of Search .......... 369/264, 271, 270, 247, 369/258, 266

[56] References Cited

U.S. PATENT DOCUMENTS

| | | | |
|---|---|---|---|
| 4,176,847 | 12/1979 | Akai et al. | 369/266 X |
| 4,535,438 | 8/1985 | Massarelli et al. | 369/271 X |
| 4,680,211 | 7/1987 | Evans et al. | 346/137 X |
| 4,786,997 | 11/1988 | Funebashi et al. | 369/271 |
| 4,829,510 | 5/1989 | Takahashi | 369/271 |
| 4,841,516 | 6/1989 | Ohmori et al. | 369/271 X |

FOREIGN PATENT DOCUMENTS 62-47861  3/1987  Japan .................. 369/264

Primary Examiner—Stuart S. Levy
Assistant Examiner—Joseph A. Rhoa
Attorney, Agent, or Firm—Nikaido, Marmelstein, Murray & Oram

[57] ABSTRACT

A compact disk player has a polycarbonate turntable, and a clamper (201) for clamping a compact disk on the turn table. The turn table is made of the same material (polycarbonate) as the compact disk and includes a disk body, a central hub projected from the disk body to receive a center hole of a compact disk and a peripheral annular portion formed integrally with the disk body.

1 Claim, 3 Drawing Sheets

POLYCARBONATE TURNTABLE FOR A COMPACT DISK PLAYER

This application is a continuation of application Ser. No. 582,080 filed Sep. 14, 1990, now abandoned.

BACKGROUND OF THE INVENTION

The present invention relates to a compact disk player, and more particularly to a car compact disk player.

It is required that the car compact disk (hereinafter called CD) player has good resistivities to heat and humidity and reliabilities against vibration and dust. In a conventional CD player, a turn table is made of metal and the CD is made of plastic, and hence thermal expansion coefficients of those materials are different from each other. The CD is held on the turn table. Consequently, the gap between an inside wall of a central hole of the CD and outer periphery of the turn table changes with temperature, which may cause a change of the distance between the CD and a pick-up. If the distance between the CD and the pick-up changes with temperature, reproduction of high fidelity can not be expected.

SUMMARY OF THE INVENTION

The object of the present invention is to provide a CD player which may reproduce data on the CD with high fidelity.

According to the present invention, there is provided a compact disk player having a turn table, and a clamper for clamping a compact disk on the turn table. The turn table is made of the same material as the compact disk.

In an aspect of the invention, the turn table and the compact disk are made of plastic.

DETAILED DESCRIPTION OF THE PREFERRED EMBODIMENT

Figure 1A:
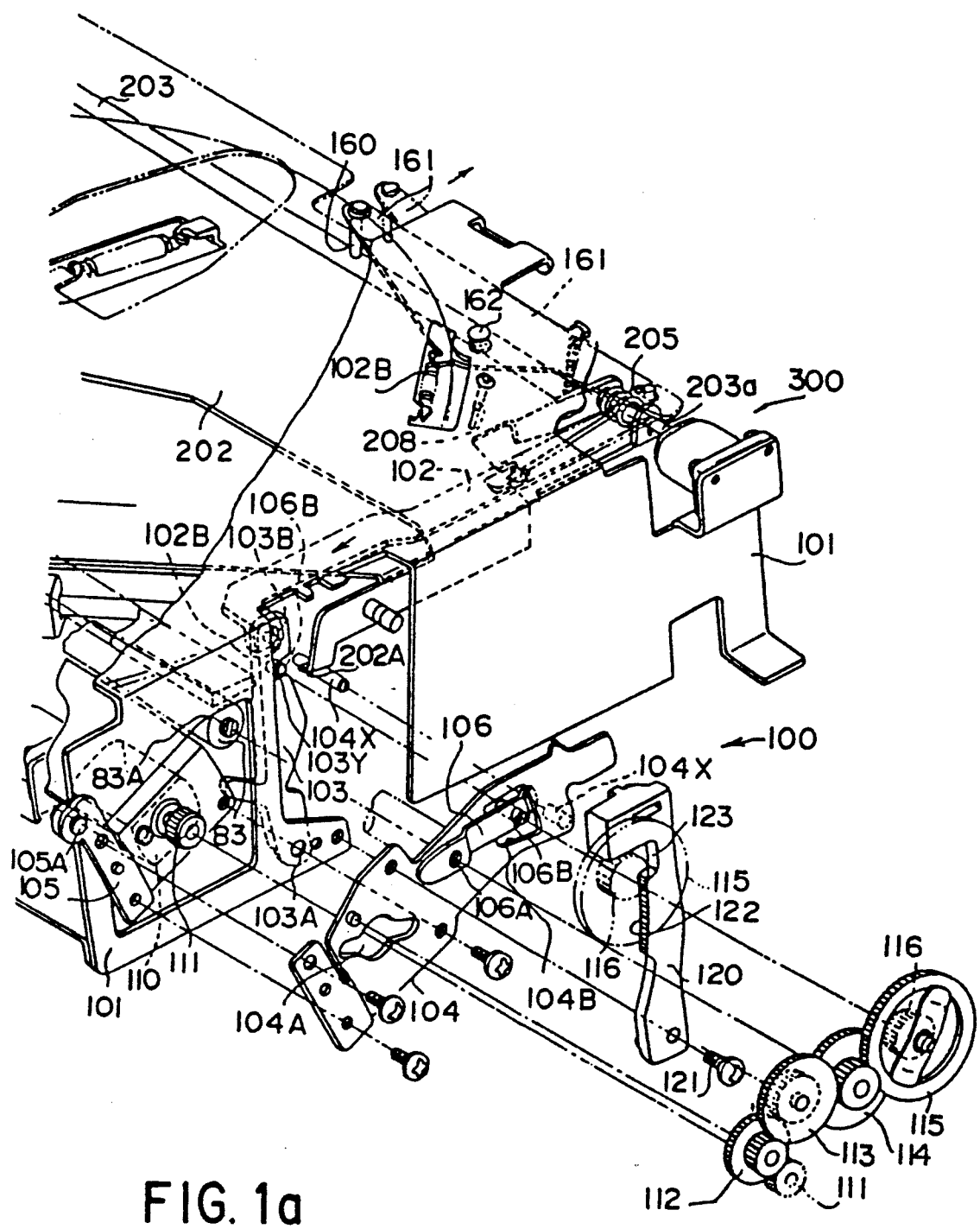
FIGS. 1a and 1b are perspective views showing a CD player to which the present invention is applied.
Figure 1B:
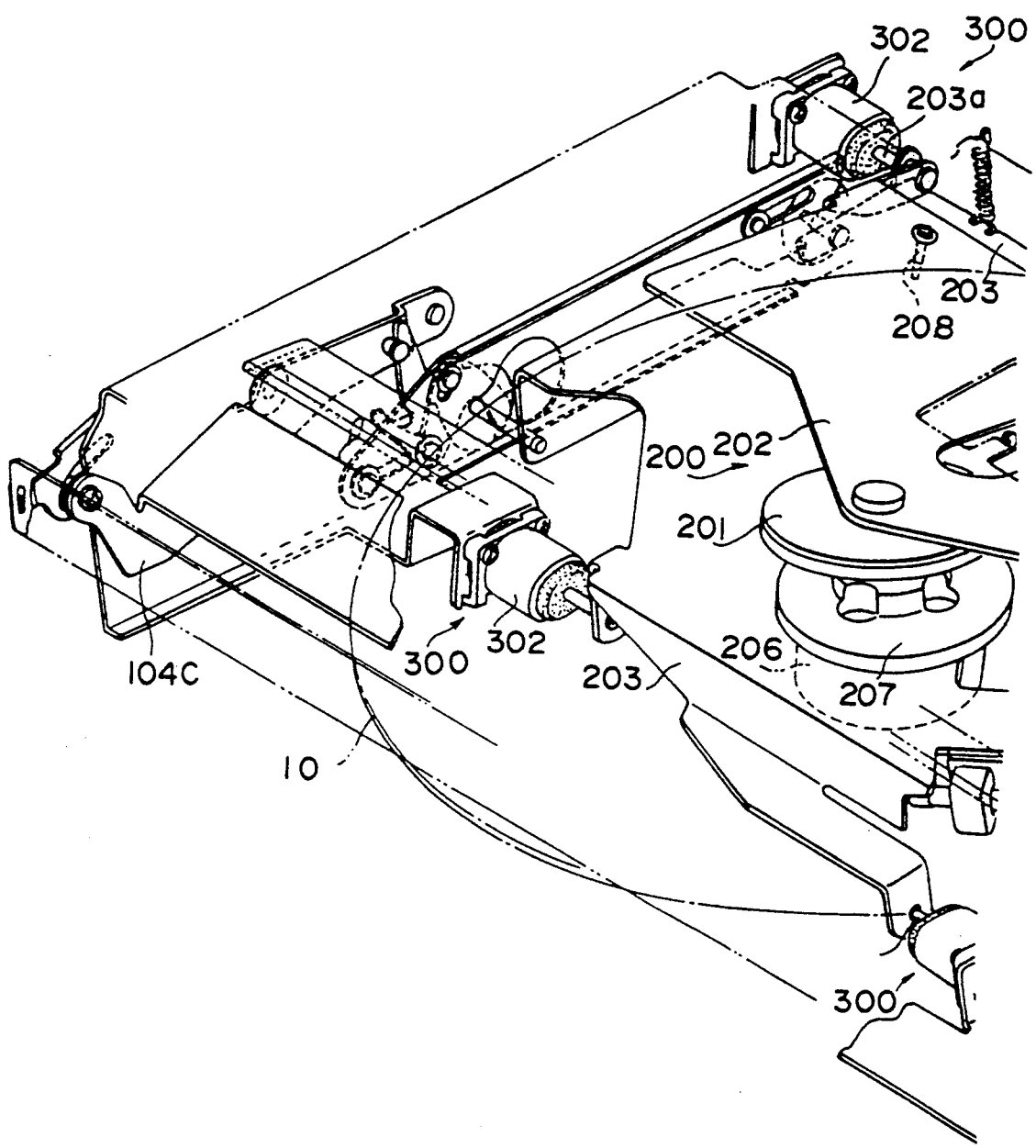
Figure 2:
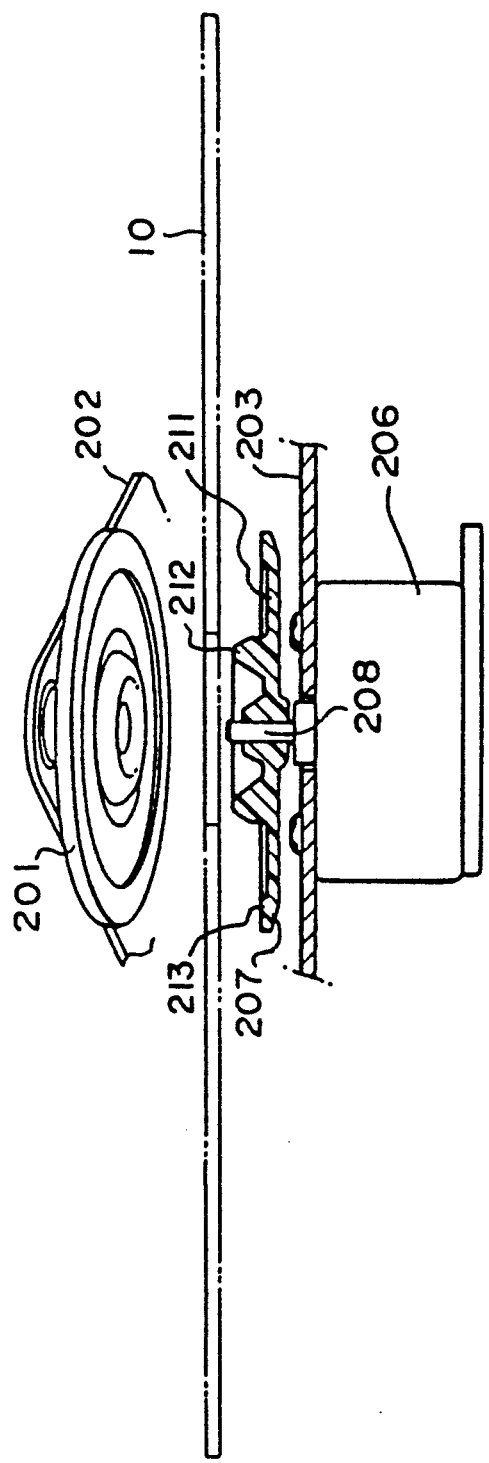
FIG. 2 is a side view showing a main part of the CD player relative to the present invention.

Referring to FIGS. 1a and 1b, the CD player comprises a loading device 100, a carriage device 200, and a floating support device 300. The loading device 100 is mounted on a chassis 101. The carriage device 200 has a clamp arm 202 and a chassis 203. The chassis 203 is supported on the chassis 101 through a plurality of dampers 302 of the floating support device 300. The clamp arm 202 is pivotally mounted on shafts 203a of a pair of dampers 302 and urged in the counterclockwise direction by a spring 205. The clamp arm 202 has a clamper 201. Corresponding to the clamper 201, a turn table 207 is disposed and secured to a rotating shaft 208 (FIG. 2) of a motor 206 which is secured to the chassis 203. The turn table 207 comprises a disk body 211, a central hub 212 in a form of an annular projection, and a peripheral annular projection 213, which are integrally molded. The turn table 207 is made of the same base or substrate material as a compact disk 10, for example plastic such as polycarbonate. The hub 212 is provided to be engaged with a center hole of the compact disk 10, and the annular projection 213 receives the compact disk. A sensing arm 161 having a pin 160 at an end which engages with the CD 10 is pivotally mounted on a shaft 162. To the other end of the arm 161, a release lever 102 is connected, which is slidably supported on the underside of the chassis 101.

The loading device 100 comprises a support lever 105 pivotally mounted on a shaft 105A secured to the chassis 101, a loading lever 104 secured to the support lever 105 at a base end portion thereof, and a free lever 106 pivotally mounted on a shaft 106A with friction. The shaft 106A is pivotally mounted on the loading lever 104. The loading device 100 further has a lock lever 103 pivotally mounted on a shaft 103A secured to the chassis 101, and a rack 120 having teeth 122 and a recess 123 and secured to the chassis 101 by a screw 121. A loading motor 110 is securely mounted on the support lever 105. A pinion 111 secured to the rotating shaft of the loading motor 110, which is projected from the loading lever 104 passing through an opening 104A is engaged with a gear 112 rotatably mounted on the loading lever 104, which in turn engages with a gear 113 rotatably mounted on the loading lever 104. The gear 113 engages with a gear 114 which is secured to the shaft 106A. The gear 114 engages with a gear 115 having a pinion 116 and rotatably mounted on a shaft 106B secured to the free lever 106. The pinion 116 is adapted to be engaged with the teeth 122 of the rack 120. A stop pin 104X is mounted on the loading lever 104 which engages with a leg 202A of the clamp arm 202, thereby holding the clamp arm in an open position.

The lock lever 103 is pivotally mounted on a shaft 103A secured to the chassis 101 and has a notch 103Y. The shaft 106B of the free lever 106 extends passing through an opening 104B of the loading lever 104 and engages with the notch 103Y. The lock lever 103 has an elongated hole 103B which engages with a pin 102B mounted on the release lever 102.

A loading roller 83 is rotatably mounted on the loading lever 104 and a lever 104C provided on the other side of the chassis 101. A shaft 83A of the loading roller 83 is secured to the shaft 106A of the gear 114 so that the loading roller 83 rotates together with the gear 114.

In an unloading state, the pinion 116 is located in the recess 123, and hence it does not engage with the rack teeth 122. When a CD is loaded in the player, the motor 110 starts, so that the gear train rotates idly. The rotation of the gear 114 causes the loading roller 83 to rotate, so that the CD is carried into the player. The CD 10 loaded in the player engages with the pin 160 to pivot the sensing arm 161 about the shaft 162 in the clockwise direction against a spring 102B as shown by dot-dash line, so that the release lever 102 is shifted in the direction shown by the arrow. Consequently, the lock lever 103 is pivoted in the counterclockwise direction about the shaft 103A, so that the shaft 106B is released from the notch 103Y to release the free lever 106. On the other hand, the CD 10 is stopped by stopper pins 208.

The gear 114 is rotated in the clockwise direction at that time. Consequently, the free lever 106 is pivoted in the clockwise direction by the friction between the shaft 106A and the free lever 106. Thus, the pinion 116 engages with the teeth 122 of the rack 120 and rolls in the rack downwardly. Accordingly, the shaft 106B abuts on the wall of the opening 104B, so that the loading lever 104 is rotated in the clockwise direction. As a result, the pin 104X lowers so that the clamp arm 202 is pivoted in the counterclockwise direction by the spring 205. Thus, the clamper 201 clamps the CD 10 on the turn table 207. The motor 206 operates to play the CD. When the CD player stops playing the CD, the loading motor 110 rotates reversely, and each device operates in reverse, so that the CD is discharged from the CD player.

In accordance with the present invention, the turn table is made of the same material as the CD. Therefore, the relative position of the CD to the turn table does not change, so that data on the CD is reproduced with high fidelity.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An improved combination of a) a compact disk having a substrate formed of polycarbonate and b) a compact disk player having a turn table and a clamper for clamping said compact disk on the turn table, wherein the improvement comprises:

said turn table having 1) a disk body, 2) a central hub projected from a central portion of said disk body so as to be engaged with a center hole of said compact disk and 3) a peripheral annular portion for receiving said compact disk, said peripheral annular portion upwardly projects from an upper surface of said disk body and said peripheral annular portion is located inside of a periphery of said upper surface, said central hub, said disk body and said peripheral annular portion being integrally molded together; and said disk body, central hub and peripheral annular portion of said turn table are made entirely of polycarbonate.

* * * * *